United States Patent Office 3,470,176
Patented Sept. 30, 1969

3,470,176
CATALYZED NITRILE TRIMERIZATION PROCESS
Joseph La Mar Zollinger, Woodbury Township, Minn., assignor to Minnesota Mining and Manufacturing Company, St. Paul, Minn., a corporation of Delaware
No Drawing. Filed Mar. 10, 1967, Ser. No. 622,038
Int. Cl. C07d 55/50
U.S. Cl. 260—248                                 19 Claims

ABSTRACT OF THE DISCLOSURE

This invention relates to an improved process for trimerizing nitriles to form triazine rings wherein the process is conducted in the presence of certain organometallic compounds of metals of Groups IV and V of the Periodic Table.

BACKGROUND

Nitriles are known to trimerize typically in the presence of heat, pressure and sometimes catalysts to form triazine rings. Such nitriles as perfluoroalkyl nitriles are known to trimerize only at high pressures. For example, high pressure has been accompanied only by high temperatures (Reilly and Brown, Journal of Organic Chemistry, 22, 698 (1957)) while in other instances large (20 to 50%) concentrations of anhydrous hydrochloric acid and a range of temperatures of from 25 to 150° C. have been used (Bissell and Spenger, Journal of Organic Chemistry, 24, 1147 (1959)). No methods for the trimerization of nitriles in the presence of organometallic compounds of metals of Groups IV and V of the Periodic Table have been reported.

Triazine-linked polymers have been the subject of growing interest in recent years, and fluoroaliphatic backbones in triazine-linked polymers have been a particular area of interest. The prior art describes, to the knowledge of the inventor, only three successful methods for the preparation of triazine-linked polymers containing fluorinated backbones. Each of these methods describes the preparation of triazine-linked polymers with perfluorocarbon backbones. Each of the methods involves the elimination of a small molecule to attain the formation of the triazine ring. The elimination of a small molecule is undesirable because it involves loss of molecular weight, concomitant side reactions and/or bubbling due to evolved gas. The known methods are discussed in the journal Rubber Chemistry and Technology, volume 39, pp. 1178 through 1183 (1966). In one method poly(perfluoroalkylene imidoylamidines) are acylated and cyclodehydrated to give linear triazine polymers. This method has the disadvantage that it requires several separate steps to obtain the desired product. The second method for the preparation of triazine-linked perfluoroalkylene polymers involves splitting out bromine under mercury catalysis at 250 to 300° C. from bis-2,4-(bromodifluoromethyl)-6-trifluoromethyl-1,3,5-triazine and its homologs, and has been demonstrated to produce high molecular weight linear polymers. The third method which has been demonstrated for the preparation of triazine-linked perfluoroalkylene polymers also yields linear polymers. It involves the free radical coupling of iodo and diazo fluoroalkyl triazines under ultraviolet light. None of these processes involves catalytic trimerization of nitriles to form triazine-linked polymers. In this disclosure the term triazine refers to s-triazine rings of the form

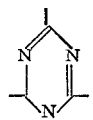

SUMMARY

In accordance with the present invention trimerizable nitriles are trimerized to form triazine rings by contacting such nitriles under substantially anhydrous conditions with at least one organometallic compound of the general formula:

(1) 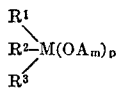

wherein $R^1$, $R^2$ and $R^3$ are each selected from the group consisting of aliphatic radicals containing less than 19 carbon atoms each and aromatic radicals containing less than 19 carbon atoms each;
M is selected from the group consisting of $As^V$, $Sb^V$ and $Sn^{IV}$;
A is selected from the group consisting of hydrogen, lower aliphatic radicals, aromatic radicals of less than 19 carbon atoms each, and the radical

O is oxygen;
$m$ is the integer zero or 1;
$p$ is the integer 1 or 2; and
when $m$ equals 1, the sum of $3+p$ is equal to the valence of M, and when $m$ is zero, M is $As^V$ or $Sb^V$.

The term "aromatic radical" in Formula 1 has reference to any unsubstituted aromatic radical, or to an aromatic radical substituted by certain groups, namely —$NQ_2$, OQ, or Q, where Q is an aliphatic radical. "Aliphatic radicals" can be substituted or unsubstituted.

The most preferred catalysts of this invention are those in which $R^1$, $R^2$, and $R^3$ are each an alkyl radical. I theorize (although I do not wish to be bound by theory) that decreased electron density at the metal atom reduces the effectiveness of an organometallic catalyst of Formula 1.

Examples of aliphatic radicals include alkyl, alkoxyalkyl, cycloalkyl, and fluoroalkyl radicals each having from about 1 to 12 carbon atoms, such as methyl, ethyl, n-propyl, isobutyl, n-butyl, n-pentyl, n-decyl, cyclohexyl, n-dodecyl, 4-methoxyhexyl, 3,3,4,4,5,5,5-heptafluoro-n-pentyl and the like.

Examples of aromatic radicals include phenyl, biphenyl, α-naphthyl, p-methoxyphenyl, o-methoxyphenyl, p-di-methylaminophenyl, and the like.

In this application the term "lower" has reference to a radical which contains a total of less than 8 carbon atoms. A preferred catalyst for use in the present invention is one where (referring to Formula 1) R is a lower alkyl radical.

Most preferred catalysts are those where M is antimony, and where either $m$ equals zero and $p$ equals 1, or $m$ equals 1, A equals hydrogen, and $p$ equals 2.

Examples of Formula 1 compounds include:

$(n-C_4H_9)_3Sb(OH)_2$
$(C_3F_7CH_2CH_2)_3SbO$
$(CH_3)_3SbO$
$[(n-C_4H_9)_3Sn]_2O$
$(CH_3)_3AsO$
$(n-C_4H_9)_3SnOCH_3$
$(C_2H_5)_3SbO$
$(C_6H_{13})_2(C_3F_7CH_2CH_2)SbO$
$(C_{18}H_{37})_2(C_2H_5)Sb(OCH_3)_2$

$(C_2H_5)_3SnOH$
$(C_6H_{13})_3SnOC_4H_9$
$[(C_3F_7CH_2CH_2CH_2)_3Sn]_2O$
$(CH_3)_3Sb(OC_4H_9)_2$
$(ClCF_2ClCF_2CH_2CH_2)_3Sb(OH)_2$
$(C_6H_5)_2(n-C_3H_7)SbO$
$(CH_3)SbO(i-C_3H_7)_2$
$(n-C_4H_9)_3SbO$
$(C_3F_7CH_2CH_2)Sb(O)(n-C_4H_9)_2$
$(n-C_4H_9)_3SbO \cdot CH_3CH_2OH$
$(CH_3)_3Sb(OH)_2$
$(CH_3)_3Sb(OCH_3)_2$
$(n-C_4H_9)_2Sb(O)(C_6H_5)$
$(C_3H_7)_3Sb(OH)_2$
$(C_{12}H_{25})_3Sb(OH)_2$
$(CF_3CH_2CH_2)_3AsO$
$(C_4H_9)_3As(OH)_2$
$(C_6H_5)(C_4H_9)_2Sb(OH)_2$
$(C_6H_5CH_2CH_2)(C_2H_5)_2As(OC_4H_9)_2$
$(C_3H_7)_3SnOSn(C_3H_7)_3$
$(o-CH_3C_6H_4)(C_6H_{13})_2Sb(OH)_2$
$[(C_{12}H_{25})_2(C_4H_9)Sn]_2O$
$(C_2H_5)(C_4H_9)(C_6H_{13})SbO$
$(C_6H_5)_3SbO$
$(o-CH_3C_6H_4)_2(i-C_4H_9)AsO$
$[p-(CH_3)_2N-C_6H_4]Sb(OH)_2$
and the like.

The term "substantially anhydrous conditions" as used herein in reference to trimerization process conditions has reference to the fact that the total amount of water present in a reaction zone is such that it does not appreciably interfere with production of trimer from starting material under a given set of reaction conditions.

As a practical matter, I prefer that the total amount of water should not exceed about 1 mole percent water from all sources (based on reactants) excluding bound water of hydration, and more preferably should be less than 0.1 mole percent. The sources of water which must be excluded to the limit to which it is practical include impurities in the reactants, water adsorbed on equipment used, and atmospheric moisture.

The compounds of Formula 1 can be prepared by following the teachings given in Die Chemie Der Metall-Organischen Verbindungen by E. Krause and A. Groose, published by Edward Brothers, Ann Arbor, Michigan (1943), in Organometallic Compounds by G. E. Coates, published by John Wiley and Sons, Inc., New York (1956), and in Chemistry of Organometallic Compounds by E. G. Rochow, D. T. Hurd, and R. N. Lewis, published by John Wiley and Sons, Inc., New York (1957).

It has been found that certain solvents used in the preparation of the catalysts, such as ethanol or water, sometimes complex weakly with the catalysts of this invention, although they may be removed by careful evaporation. The presence of such solvents generally reduces the catalytic activity of the catalysts to some degree, but the catalysts do retain varying degrees of catalytic activity, depending in part upon the kind and amount of solvent complexed, the specific catalyst, and the specific nitrile to be trimerized.

Trimerizable nitriles suitable for use in the present invention are included within the following general formula:

(2)    XCN where X is a haloaliphatic radical.

Preferred compounds of Formula 2 above are those wherein X is the radical (3) 

where Y is fluorine, chlorine, cyano, or a fluoroaliphatic radical, and $Z_1$ and $Z_2$ are each selected from the group consisting of fluorine, chlorine, and lower perfluoroalkyl, and when either $Z_1$ or $Z_2$ is a lower perfluoroalkyl, the other Z is fluorine.

Most preferred compounds of Formula 2 are those wherein X contains one or more cyano groups, that is, where XCN is a fluoroaliphatic polynitrile.

In the radical of Formula 3, the fluoroaliphatic radical is a fluorinated aliphatic radical containing at least one carbon atom in the skeletal chain. The chain may be straight, branched, or cyclic, and may be interrupted by divalent oxygen atoms, divalent sulphur atoms, the trivalent radical $=NO-$, the divalent radical $=SF_4$, the trivalent radical $\equiv C_3N_3$ (s-triazine), the divalent radical $=SO$, or the divalent radical $=SO_2$ each of which is bonded only to carbon atoms. The fluoroaliphatic radical can contain one or more nitrile or cyano (i.e., $-C\equiv N$) groups. Preferably, such skeletal chain does not contain more than one oxygen or sulphur atom for every two carbon atoms in the skeletal chain. It is preferred to have only fluorine present as substituents to satisfy non-skeletal valences. An occassional hydrogen atom, bromine, or chlorine atom may be present as substituents in such fluoroaliphatic radical preferably not more than one non-fluorine substituent being present in such radical for every two carbon atoms. Preferably, such fluoroaliphatic radical contains less than about 50 carbon atoms in its skeletal chain because of the difficulty in preparation of longer chained fluoroaliphatic radicals.

Examples of suitable nitriles within the scope of Formula 2

$CF_3CN$
$C_3F_7CN$
$C_5F_{11}CN$
$C_7F_{15}CN$
$C_2F_5OC_2F_4CN$
$CF_3O(C_2F_4O)_2CF_2CN$
$CF_3OCF(CF_3)CF_2OCF(CF_3)CN$
$F[CF(CF_3)CF_2O]_8CF(CF_3)CN$
$Br(C_2F_4O)_5CF_2CN$
$Cl(C_2F_4O)_4C_2F_4CN$
$H(CF_2)_6CN$
$Cl_3CCN$
$F[(CF_2)_6O(CF_2)_4]_2CF_2CN$
$C_2F_5O(CF_2)_2[(CF_2)_2O(CF_2)_2]_4CN$
$NC(CF_2CF_2OCF_2CF_2)_4CN$
$C_2F_5CN$
$C_4F_9CN$
$C_6F_{13}CN$
$CF_3OCF_2CN$
$C_2F_5O(C_2F_4O)_2-CF_2CN$
$C_2F_5O(C_2F_4O)_2C_2F_4CN$
$HCF_2O(C_2F_4O)_4CF_2CN$
$F(CF_2)_8O(CF_2)_2CN$
$Br(C_2F_4O)_4C_2F_4CN$
$Cl(C_2F_4O)_3CF_2CN$
$Cl(CF_2CFCl)_3CF_2CN$
$(CF_3)_2CFCN$

F[(CF$_2$)$_4$O(CF$_2$)$_4$]$_2$(CF$_2$)$_2$CN
NC(CF$_2$)$_8$CN
NC(CF$_2$)$_4$CN
NC(CF$_2$)$_5$CN
NCCF$_2$CN
NCCF$_2$[O(CF$_2$)$_4$]$_3$OCF$_2$CN
NCCF$_2$[O(CF$_2$)$_4$]$_3$OCF$_2$CN
NCCF$_2$OCF$_2$CN
NCCF(CF$_3$)O(CF$_2$)$_5$OCF(CF$_3$)CN
NCCF(CF$_3$)O(CF$_2$)$_2$OCF(CF$_3$)CN
NCCF(CF$_3$)O(CF$_2$)$_3$OCF(CF$_3$)CN
NC(CF$_2$)$_2$O(CF$_2$)$_2$CN
NCCF$_2$O(CF$_2$)$_3$OCF$_2$CN
NC(CF$_2$)$_2$SF$_4$(CF$_2$)$_2$CN
NC(CF$_2$)$_2$SO(CF$_2$)$_2$CN
CF$_3$CF$_2$SF$_4$(CF$_2$)$_2$CN
CF$_3$CF$_2$SO(CF$_2$)$_2$CN
NC(CF$_2$)$_2$SF$_4$(CF$_2$)$_4$SF$_4$(CF$_2$)$_2$CN
NC(CF$_2$)$_2$SO(CF$_2$)$_4$SO(CF$_2$)$_2$CN
NCCF(CF$_3$)[OCF$_2$CF(CF$_3$)]$_2$O(CF$_2$)$_5$OCF(CF$_3$)
   CF$_2$OCF(CF$_3$)CN
NCCF(CF$_3$[OCF$_2$CF(CF$_3$)]$_2$O(CF$_2$)$_5$
   O[CF(CF$_3$)CF$_2$O]$_2$CF(CF$_3$)CN
NC(CF$_2$)$_2$O(CF$_2$)$_4$O(CF$_2$)$_3$O(CF$_2$)$_2$OCF$_2$CN

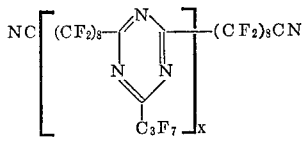

wherein $x$ ranges from about 1 to 300, and such that the average value of $x$ is about 120

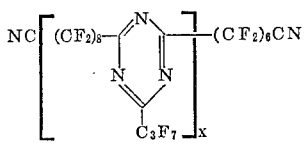

wherein $x$ ranges from about 1 to 300, and such that the average value of $x$ is about 100

NC(CF$_2$)$_{12}$CN
NCCF$_2$O(CF$_2$)$_4$OCF$_2$CN
NC(CFClCF$_2$)$_2$CN
NC(CF$_2$)$_2$O(CF$_2$)$_2$CN
NCCF$_2$OCF(CF$_3$)CN
NCCF(CF$_3$)O(CF$_2$)$_4$CN
NCCF(CF$_3$)O(CF$_2$)$_2$CN
NC(CF$_2$)$_2$[O(CF$_2$)$_4$]$_3$O(CF$_2$)$_2$CN
NC(CF$_2$)$_2$S(CF$_2$)$_2$CN
NC(CF$_2$)$_2$SO$_2$(CF$_2$)$_2$CN
CF$_3$CF$_2$S(CF$_2$)$_2$CN
CF$_3$CF$_2$SO$_2$(CF$_2$)$_2$CN
NC(CF$_2$)$_2$S(CF$_2$)$_4$S(CF$_2$)$_2$CN
NC(CF$_2$)$_2$SO$_2$(CF$_2$)$_4$SO$_2$(CF$_2$)$_2$CN
NC[(CF$_2$)$_m$O(CF$_2$)$_n$]$_y$CN wherein $m$ and $n$ each separately ranges from 1 to about 10, and $y$ ranges from 1 to about 50

NC(CF$_2$)$_k$[(CF$_2$CH$_2$)$_j$CF$_2$CF(CF$_3$)]$_L$(CF$_2$)$_h$CN wherein $k$, $j$ and $h$ range from 1 to about 20, and L varies from 1 to about 50.

The nitriles of Formula 2 generally are available commercially and/or can be prepared readily by known synthesis techniques. If triazine-linked polymers are to be made, the reaction mixtures must contain at least some polynitrile starting material, as will be obvious to those skilled in the art. Polynitriles are those nitriles having two or more nitrile groups in the molecule. One may use mixtures of polynitriles and mononitriles, or polynitriles alone, or any of the permutations of mononitriles and polynitriles, to obtain polymers. However, each of the carbon atoms adjacent to the nitrile to be trimerized must be substituted as described in Formula 3. When the process of this invention is used for curing nitrile-terminated polymers or prepolymers, it will be recognized that the degree of cross-linking obtained will be dependent upon the number of nitrile groups per molecule available for reaction. Using dinitrile monomers as an example, it is found that a triazine-linked polymer of a dinitrile, e.g. sebaconitrile, is crosslinked, and its physical state is that of an insoluble, white, brittle solid. However, if this dinitrile is copolymerized with, for example, about 45 mole percent perfluorohexanonitrile, the resulting polymer is a transparent rubbery solid because this latter polymer is less highly crosslinked. Because the degree of crosslinking may be varied widely, these polymers may be used in a variety of applications such as sealants, O rings, gaskets, and the like.

Polynitriles used as starting materials for the preparation of polymers containing s-triazine linkages are available. Dinitriles may be prepared by the reaction of triphenyl phosphine with compounds terminated by a —CF$_2$NF$_2$ group, by the dehydration of fluoroaliphatic amides, or by various other synthetic methods known to the art. Polynitriles containing three or more nitrile groups up to at least ten nitrile groups per molecule may be made by the photolysis of fluoroaliphatic acid fluorides, followed by conversion of the resulting acid fluorides to amides, and dehydration of the amide to the corresponding nitrile.

The process of this invention provides a means whereby one can crosslink and cure any polymer terminated by the group

where V is the polymer chain, and V is preferably fluoroaliphatic as defined above, and $Z_1$ and $Z_2$ are as defined above. An example of a linear polymer containing cyano groups which is crosslinked and cured by the process of this invention is

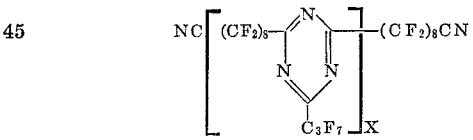

where $x$ is 50. (Polymers where $x$ varies up to 300 are reported and these polymers and mixtures thereof are trimerized in order to cure them.)

Such polymers can be made by partial trimerization of nitriles under very mild conditions, for example atmospheric pressure and temperatures from 20 to 100° C., followed by subsequent curing of the prepolymer thus formed. However, suitably activated nitrile-terminated polymers made by conventional methods are also cured by the process of this invention.

It is preferred to employ such a combination of Formula 2 nitrile with Formula 1 catalyst that the catalyst is at least partially soluble in the nitrile, or vice versa, so that catalyst and nitrile are brought into maximum possible contact with one another. Sometimes the Formula 2 nitrile is a solid and the Formula 1 catalyst is a liquid, in which event it is preferred to have the nitrile partially soluble in the catalyst; other times, the nitrile is liquid and the catalyst is solid, in which event it is preferred to have the catalyst at least partially soluble in the nitrile. Still other times the catalyst and the nitrile are both liquids, in which event it is preferred to have some mutual solubility one in the other. Even less than about 5 percent by weight of nitrile in catalyst, or catalyst in nitrile, is adequate partial solubility.

Occasionally the nitrile is gaseous, in which event it is preferred to have a catalyst which will absorb the nitrile thereon or therewithin.

Sometimes it is desirable to employ an inert solvent, organic in nature, in which both the catalyst and the nitrile are mutually soluble so as to trimerize, for example, when a catalyst of Formula 1 and nitrile of Formula 2 are not sufficiently soluble in each other to react, or to increase the rate of reaction when limited solubility reduces the rate of reaction, or to permit trimerization of a volatile or solid nitrile. In general, it is preferred to conduct a trimerization in the absence of inert solvent so as to avoid the problem of subsequently removing solvent from reaction products.

The term "inert solvent" as used herein has reference to an organic liquid which is substantially unreactive with both the reactants and reaction products and in which the reactants are soluble to a prechosen, desired extent. It is generally preferable to choose one which is readily separated from the reaction products. Suitable solvents include aliphatic halocarbons, such as chloroform, carbon tetrachloride, fluorotrichloromethane, and trichloroethlene; cycloaliphatic halocarbons, such as chlorocyclohexane; aliphatic hydrocarbons, such as n-hexane, n-heptane, and 2-methylhexane; cycloaliphatic hydrocarbons, such as cyclopentane cyclohexane; aromatic compounds, such as benzene, toluene; hydrocarbon esters, such as ethyl acetate, isopropyl acetate; and the like.

Reaction temperatures are variable but commonly are below 150° C. and above 0° C. The rate of a trimerization reaction differs from one situation to another, depending upon the temperature as well as the particular nitrile and the specific type and amount of catalyst used. Generally, for a given combination of nitrile and catalyst, a rate of reaction will be higher at higher temperatures (see Table V below).

Reaction pressures are generally atmospheric, although high pressures may sometimes accelerate trimerization.

Reaction times are not critical, but should preferably be of sufficient length to permit a trimerization reaction to be essentially completed. The time required for reaction of a given catalyst, nitrile, and temperature combination varies depending especially upon the nitrile or nitriles used in the reaction, but may be adjusted somewhat by control of other variables. In general, reaction times are determined by a number of process variables, such as equipment, reaction conditions, reactants, etc.; typical times range from about 15 minutes to one week at room temperature and atmospheric pressure.

The mechanism by which a catalyst of Formula 1 acts during trimerization of a nitrile of Formula 2 is not known, but when using a catalyst of Formula 1 it is necessary to bring a nitrile of Formula 2 into intimate contact with a catalyst of Formula 1 for catalytic effect. No lower limit as respects the minimum amount of catalyst which must be present for a unit weight of nitrile is known, but, in general, it is preferred to employ at least about 0.0001 mole Formula 1 catalyst for each mole of Formula 2 nitrile to be trimerized. In general, the maximum amount of catalyst permissible is a 1 to 1 mole ratio per nitrile group, since at this concentration, according to infrared spectral determinations no triazine is formed, but only catalyst-nitrile complex is formed.

Although catalyst concentration relative to nitrile concentration is not critical, it is preferably within the range of from about 0.1 to 10 mole percent. Trimerization yields are affected by this ratio. The effect of change in catalyst concentration upon the rate and extent of reaction is illustrated by the following Table I. Observe that good yields are obtained even at low (0.2 mole percent) catalyst concentrations, but that the rate of reaction is much more rapid with higher catalyst concentration. In Table I, the trimerization of $C_5F_{11}CN$ at 25° C. using (n-$C_4H_9$)$_3$SbO "A" (see Example 4) as catalyst is monitored by vapor phase chromatographic analysis. In this trimerization, no solvent is used, and the system is sealed at atmospheric pressure to reduce the possibility of interference by adventitious moisture.

TABLE I

| Mole percent catalyst | Percent trimerization after— | | | | |
|---|---|---|---|---|---|
| | 0.5 hr. | 1 hr. | 2 hr. | 4 hr. | 6 hr. |
| 0.2 | 10 | 18 | 29 | 45 | 56 |
| 0.6 | 26 | 38 | 53 | 71 | 82 |
| 0.9 | 49 | 62 | 78 | 91 | 94 |
| 5 | 82 | 89 | 95 | 99 | 100 |

The extent of reaction during the trimerization process may be followed conveniently by vapor phase chromatography (when the reactants and products are gases or liquids) or by infrared spectral measurements (for any physical state). The infrared spectra show the extent of reaction by the disappearance of the nitrile band at about 4.4 microns, and the appearance of the strong band at about 6.4 microns due to the triazine ring. When polymers are formed, the extent of reaction may be monitored by the viscosity increase of liquid monomer-catalyst mixtures.

It is preferable to protect the reaction mixtures containing nitrile and catalyst from atmospheric moisture to maintain satisfactory reaction rates, since water apparently tends to decompose the catalyst-nitrile complexes involved in the trimerization process.

Isolation of the substituted triazine products produced by trimerization depends on the physical properties of the products. In general, liquids may be isolated and purified conveniently by vapor phase chromatography, distillation, or solid-liquid absorption chromatography, while solids may also be purified by conventional techniques such as recrystallization and solid-liquid absorption chromatography. Polymers may be washed or extracted by solvents, although some telomers may be handled as liquids or solids.

A complex is formed between the catalyst and the nitrile, and the complex may be detected by characteristic bands in the infrared spectrum. This complex forms with many nitriles. It has been found that if this complex is placed in contact with a fresh batch of nitrile, whether this fresh batch of nitrile is the same nitrile used to form the complex, or a different nitrile, the complex acts as a trimerization catalyst equivalent to a Formula 1 catalyst of this invention.

Surprisingly, it has been found during the preparation of one of the most active catalysts of this invention, (n-$C_4H_9$)$_3$SbO, that if a small amount of impurity consisting of complexed mercury (see Example 4) remains as a component of a catalyst mixture rather than completely purifying the (n-$C_4H_9$)$_3$SbO, the activity of this catalyst is enhanced. One preparation of this activated or promoted catalyst is given below (see Example 4), together with a comparison of the reactivity of this promoted catalyst with that of an unpromoted (purified) (n-$C_4H_9$)$_3$SbO under comparable conditions (see Table II below). The comparison demonstrates that this activated catalyst, designated in this disclosure as (n-$C_4H_9$)$_3$SbO "A", is more effective. This example demonstrates that a mercury containing trialkyl substituted antimony oxide prepared by the oxidation of a trialkyl antimony compound with mercuric oxide is an effective catalyst of this invention.

The compound (n-$C_4H_9$)$_3$Sb can be used to generate in situ a catalyst of Formula 1 if the reaction is run in the presence of air. Presumably (n-$C_4H_9$)$_3$Sb is oxidized by the air to form the true catalyst. Similar air oxidations can be used to convert in situ other organometallic compounds to catalysts of Formula 1, and such in situ generated catalytic activity is within the scope of this invention.

It has been found that mixtures of nitriles may be trimerized to yield mixed triazines. By proper choice of the starting materials it is possible to prepare a wide variety of unsymmetrical substituted triazines whose physical and chemical properties range over a larger area than triazines having symmetrical substitution. The mixed triazines may be represented by the formula:

(5) 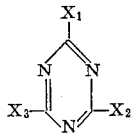

where $X_1$, $X_2$ and $X_3$ are each chosen from the group defined above as X.

In general, as those skilled in the art appreciate, triazines are important and valuable chemicals with a wide variety of uses, depending upon the substituent groups present. Fluoroalkyltriazines, for example, have characteristically high thermal stability and have a variety of high temperature applications such as hydraulic fluids, heating baths, and the like. Triazines are well known for biological activities such as insecticidal activity and germicidal activity. In addition, substituted triazines are useful as chemical intermediates for the production of a wide variety of products, including polymers.

The triazine-linked polymers produced by the process of this invention, and particularly highly fluorinated polymers, are useful materials for high temperature applications. These polymers are not soluble in aliphatic or aromatic hydrocarbons, and thus find use as fuel tank sealants and elastomer components such as for hydraulic systems operating at elevated temperatures.

This process is flexible enough to allow the preparation of triazine-linked polymers not preparable by any method heretofore known to the art.

In this disclosure it is understood that where an empirical formula is not designated as a branched chain, said chain is non-branched, however, branching is not critical to the process of this invention.

In this disclosure, the $CCl_3$ radical is equivalent to a fluoroaliphatic radical.

EXAMPLES

Reference is now made to the following examples which are inserted for the purpose of illustrating the invention, but it is to be understood that various modifications thereof will be apparent to those skilled in the art without departing from the spirit or scope of the invention.

Example 1

Catalyst.—$(C_4H_9)_3Sb(OH)_2$. This compound is prepared by passing an ethyl alcohol (95%) solution of $(C_4H_9)_3SbBr_2$ (from $(C_4H_9)_3Sb+Br_2$) through the hydroxide form of an anionic exchange resin and concentrating the effluent under vacuum to remove alcohol.

Nitrile.—Perfluorohexanonitrile, $C_5F_{11}CN$, B.P. 53° C., $n_D^{23}$ 1.2658, $d_4^{20}$ 1.543.

A mixture of 20 gm. $C_5F_{11}CN$ and 0.4 gm. of $$(C_4H_9)_3Sb(OH)_2$$

is shaken in a stoppered flask and allowed to stand at room temperature (about 23° C.). Distillation of the reaction mixture after one day affords about 17 gm. (85%) of a liquid, B.P. 151–152° C. at 38 mm., $n_D^{23}$ 1.3160, $d_4^{20}$ 1.800. The infrared spectrum reveals the absence of the 4.4 micron peak due to starting nitrile $$(-C \equiv N)$$

and the presence of a strong band at 6.4 microns due to the triazine ring. The fluorine nuclear magnetic resonance spectrum of the triazine product is consistent with the structure proposed:

$$(CF_3-CF_2-CF_2-CF_2-CF_2)_3C_3N_3$$

Analysis.—Calculated for $C_{18}N_3F_{33}$. C, 24.4. Found: C, 24.5.

Example 2

Catalyst.—$(C_4H_9)_3SbO$. This hygroscopic compound is prepared by dehydration of $(C_4H_9)_3Sb(OH)_2$, the catalyst of Example 1. This is accomplished by heating the dihydroxide in a flask at 100° C., and about 0.1 mm. Hg pressure for at least two hours, or for longer periods at lower temperatures.

Nitrile.—Perfluorohexanonitrile, $C_5F_{11}CN$. A mixture of 10 gm. of $C_5F_{11}CN$ and 0.17 gm. of $(C_4H_9)_3SbO$ is shaken in a dry stoppered flask and allowed to stand at room temperature. At the end of 8 hours a 50% conversion to $(C_5F_{11})_3C_3N_3$ is obtained as determined by infrared and vapor phase chromatographic analysis. After two days, 90% of the nitrile is converted to triazine.

Example 3

Catalyst.—$(C_4H_9)_3SbO \cdot (C_2H_5OH)_x$. This complex is prepared by stirring tributylantimony anr powdered mercuric oxide in ethyl alcohol in a closed flask for a day at room temperature. The solution is decanted from solids and concentrated under reduced pressure. Elemental analysis and proton nuclear magnetic resonance spectra reveal the presence of about one and one-half moles of complexed ethyl alcohol per mole of tributylantimony oxide.

Nitrile.—Perfluorooctanonitrile, $C_7F_{15}CN$, B.P. 108° C. About 17 gm. of $C_7F_{15}CN$ is mixed with about 0.2 gm. of $(C_4H_9)_3SbO \cdot (C_2H_5OH)_{1.5}$ in a closed glass vessel. After three days at room temperature (about 23° C.), a nearly quantitative conversion to $(C_7F_{15})_3C_3N_3$ is obtained, B.P. 110° C. at 0.15 mm. Hg pressure. Infrared analysis reveals the characteristic strong 6.4 micron absorption due to the triazine ring.

Analysis.—Calculated for $C_{24}F_{45}N_3$: C, 24.3. Found: C, 24.9.

Example 4

Catalyst.—$(C_4H_9)_3SbO$ "A." A very active catalytic form of $(C_4H_9)_3SbO$ prepared from tributylantimony and mercuric oxide in acetone. In a 500 ml. flask is placed about 100 ml. of acetone (dried over anhydrous calcium sulfate), 22.7 gm., (0.077 mole) tributylantimony and 22 gm. (0.10 mole) powdered mercuric oxide. The mixture is protected from air and stirred about one and one-half days at room temperature. The resulting acetone solution is decanted from the solids present and concentrated under reduced pressure. The residual oil is separated from all precipitated mercury and most of the remaining free acetone is removed at about 0.1 mm. Hg pressure. Elemental analysis of the clear liquid product, designated $(C_4H_9)_3SbO$ "A," shows the presence of carbon, hydrogen, oxygen, antimony, and mercury. From 0.1% to 10% of complexed mercury may be present in the activated catalyst. Infrared and proton nuclear magnetic resonance spectra reveal a close similarity to the tributylantimony oxide prepared according to Example 2. When metallic mercury is combined with $(n-C_4H_9)_3SbO$, no catalytic promotion is observerd. When HgO is combined with $(n-C_4H_9)_3SbO$, no catalytic promotion is observed.

Nitrile.—Perfluorohexanonitrile, $C_5F_{11}CN$. The enhanced catalytic activity of $(C_4H_9)SbO$ "A" as a trimerization catalyst for XCN is revealed by the following data which compare the efficiency of closely related antimony catalysts. The experiments are run in a manner similar to those in Examples 1–3. The conversion data are obtained from infrared and vapor phase chromatographic analysis.

TABLE II

| Catalyst | | Approximate $C_5F_{11}CN$ trimerization rate (2 weight percent catalysts, 22° C.) | | |
|---|---|---|---|---|
| | | | Percent conversion | |
| Formula | Source | T½[1] (hr.) | 4 hrs. | 1 day |
| $(C_4H_9)_3SbO$ "A" | Ex. 4 | 0.3 | 97 | 100 |
| $(C_4H_9)_3Sb(OH)_2$ | Ex. 1 | 0.8 | 65 | 86 |
| $(C_4H_9)_3SbO$ | Ex. 2 | 2.5 | 70 | 99 |
| $(C_4H_9)_3SbO \cdot C_2H_5OH$ | Ex. 3 | | 10 | 30 |

[1] Time to 50% conversion.

Following the procedures of Examples 1 through 4, the following catalysts (Table III) are found effective in converting $C_5F_{11}CN$ to the corresponding triazine, $$(C_5F_{11})_3C_3N_3$$

at room temperature. Faster rates are obtained at higher temperatures. One compound, $(C_4H_9)_3SnOSn(C_4H_9)_3$ is a commercial chemical obtained from Metal and Thermit Company, the others are prepared by procedures similar to those described in Examples 1 through 4 and other techniques disclosed in the chemical literature.

TABLE III
[Approximate $C_5F_{11}CN$ trimerization rate (2 weight percent catalyst, 22° C.)]

| | | Percent conversion | |
|---|---|---|---|
| Example | Catalyst | 4 hrs. | 1 day |
| 5 | $(CH_3)_3SbO$ | 20 | 70 |
| 6 | $(CH_3)_3Sb(OH)_2$ | [1] 15 | [1] 60 |
| 7 | $(C_3F_7CH_2CH_2)_3SbO$ | 5 | 13 |
| 8 | $(C_4H_9)_3SnOSn(C_4H_9)_3$ | 2 | 15 |
| 9 | $(CH_3)_3AsO$ | | [2] 30 |
| 10 | $(CH_3)_3As(OH)_2$ | | [2] 5 |
| 11 | $(CH_3)_3Sb(OCH_3)_2$ | | [2] 5 |
| 12 | $(C_4H_9)_3SnOCH_3$ | | [2] 5 |
| 13 | None | | [2] 0 |

[1] 3.8 mole percent catalyst.
[2] After less than five weeks.

Example 14

Catalyst.—The complex formed by mixing approximately equimolar quantities of tributylantimony oxide and perfluorohexanonitrile. (Infrared examination reveals no (—C≡N) band at about 4.4 microns or triazine ring absorption at about 6.4 microns, but new absorption bands in the 5.8 to 6 micron region.)

Nitrile.—Perfluorohexanonitrile, $C_5F_{11}CN$. 1.0 gm. of $C_5F_{11}CN$ is mixed with 0.018 gm. of the catalyst complex. The mixture is shaken in a stoppered glass tube and allowed to stand at 23° C. Analysis by vapor phase chromatography reveals the following percent conversion to the triazine, $(C_5F_{11})_3C_3N_3$, at the times indicated: 70% (3 hrs.), 80% (5.3 hrs.), and 95% (29 hrs.).

Example 15

Catalyst.—Tributylantimony, is used without the careful exclusion of oxygen. The actual catalyst is chiefly $(C_4H_9)_3SbO$ (from $(C_4H_9)_3Sb + O_2 \rightarrow (C_4H_9)_3SbO$). No triazine is formed when the reaction is run under nitrogen.

About 3 gm. of $C_5F_{11}CN$ is shaken with about 0.04 gm. of tributylantimony in a stoppered test tube. The mixture is permitted to stand at room temperature. An 80% conversion to $(C_5F_{11})_3C_3N_3$ takes place in two days.

Example 16

$CF_3CN$, B.P. −64° C., is condensed into a stainless steel cylinder containing $(C_4H_9)_3SbO$ catalyst (Example 2), by means of a vacuum transfer system and a liquid nitrogen bath. The valve is closed and the vessel let stand at room temperature.

Infrared examination of the reaction products reveals the presence of $(CF_3)_3C_3N_3$ which produces strong characteristic bands at 6.33 and 11.57 microns.

This triazine is also prepared in the presence of $(C_4H_9)_3SbO$ in chloroform solution. The product isolated by vapor phase chromatography is a liquid, $n_D^{22.5°C}$ 1.3208. A large parent peak due to $(CF_3)_3C_3N_3$ is observed when this liquid product is analyzed by mass spectrometry.

Example 17

Equimolar quantities of $C_5F_{11}CN$ (2.9 gm.) and $C_7F_{15}CN$ (4.1 gm.) are mixed with 0.28 gm.

$$(C_4H_9)_3Sb(OH)_2$$

(Example 1) in a closed vial. In 24 hours at 23° C., a quantitative conversion to the four possible triazine products is obtained in essentially the theoretical distribution of 12.5; 37.5; 37.5; 12.5 (or 1:3:3:1); $(C_5F_{11})_3C_3N_3$ (11.5%), $(C_5F_{11})_2C_7F_{15}C_3N_3$ (38%), $$(C_5F_{11})(C_7F_{15})_2C_3N_3$$

(39%), $(C_7F_{15})_3C_3N_3$ (11.5%). The percent values are obtained from peak areas from high temperature vapor phase chromatographic analysis of the triazine mixture. Only four symmetrical peaks are observed. Retention times in minutes are 2.6, 3.7, 5.4, and 8.1, respectively, employing a 6' x ⅜" column packed with 33% FS-1265 (a fluorinated silicone fluid manufactured by Dow Corning Corporation) on Anakrom ABS (a diatomaceous earth composition manufactured by Analabs, Inc.) operated at 180° C. and a flow of 110 cc. helium per minute. Pure $(C_5F_{11})_3C_3N_3$ and $(C_7F_{15})_3C_3N_3$ elute at 2.6 and 8.1 minutes, respectively.

Example 18

To a solution of 0.032 gm. $(C_4H_9)_3SbO$ (Example 2) in 0.5 ml. of $CH_3COO-i-C_3H_7$ is added 1.08 gm. of $C_7F_{15}CN$. The resulting solution is allowed to stand at room temperature and the reaction monitored by infrared analysis and vapor phase chromatography. The conversion to $(C_7F_{15})_3C_3N_3$ is 20% after 6 hours, 70% after 27 hours, and 85% after 54 hours.

Example 19

A solution consisting of 0.03 gm. $(C_4H_9)_3Sb(OH)_2$, 15 gm. of $C_5F_{11}CN$, and 10 ml. $Cl(CF_2CFCl)_2Cl$ is allowed to stand at room temperature in a stoppered flask. After 120 hours, a 70% conversion to $(C_5F_{11})_3C_3N_3$ is obtained. If the reaction is run at 60° C., in a sealed glass ampoule, an 80% conversion is obtained in 20 hours; 90% in 50 hours.

Example 20

About 5 gm. of $Cl(CF_2CFCl)_2CF_2CN$, B.P. 149° C. at 730 mm., is mixed with 0.10 gm. of $(C_4H_9)_3SbO$. The catalyst dissolves after about one hour at room temperature. At the end of six days, a high conversion to the viscous triazine derivative is attained as evidenced by the disappearance of the 4.4 micron absorption (in the infrared spectrum) due to —CN and the presence of the strong 6.41 micron peak of the triazine ring. Fluorine nuclear magnetic resonance absorption reveals a shift of the fluorine peak from 98.8φ for the —$CF_2CN$ group in the starting nitrile to 109.9φ for the same fluorine atoms in the triazine product $(ClCF_2CFClCF_2CFClCF_2)_3C_3N_3$.

Example 21

A mixture of trichloroacetonitrile (1.8 gm.) and 0.06 gm. of $(C_4H_9)_3SbO$ "A," is allowed to stand in a closed vial at 23° C. At the end of one week, infrared analysis reveals the presence of considerable triazine $(Cl_3C)_3C_3N_3$, as noted by the new strong absorption at 6.4 due to triazine ring.

Example 22

A mixture of 5.0 gm. of $C_5F_{11}CN$ and 0.12 gm. of $(C_4H_9)_3SbO$ "A," the catalyst of Example 4, is shaken in a closed glass ampoule and allowed to stand at room temperature, 23° C. An identical mixture is heated in a 60° C. water bath. The rate of conversion to triazine is monitored by vapor phase chromatography. The results are as shown in Table IV:

TABLE IV

| Time, hours | Percent conversion | |
|---|---|---|
| | +23° C. | +60° C |
| 0.25 | 24 | 75 |
| 0.5 | 40 | 82 |
| 2 | 70 | 91 |
| 6 | 86 | 95 |

Example 23

Catalyst.—$(C_4H_9)_3SbO$ "A" (Example 4).
Nitrile.—$C_2F_5OCF_2CF_2CN$, B.P. 35° C., $n_D^{22.5}$ 1.2529.
A mixture of 50 gm. of $C_2F_5OCF_2CF_2CN$ and 1.0 gm. of $(C_4H_9)_3SbO$ "A" are stirred in a closed flask for two days. The mixture is distilled to yield about 30 gm. of $$(C_2F_5OCF_2CF_2)_3C_3N_3$$

B.P. approximately 190° C. at atmospheric pressure, $n_D^{22}$ 1.3042.

Example 24

A mixture of 25 gm. of $C_2F_5O(C_2F_4O)_2CF_2CN$ (which is prepared by dehydration of the corresponding amide with $P_2O_5$) and 0.7 gm. of $(C_4H_9)_3Sb(OH)_2$ is stirred in a flask flushed with dry nitrogen and closed to the atmosphere. After three days, the infrared spectrum of the reaction mixture indicates a high conversion of nitrile to triazine. The mixture is distilled under high vacuum to yield the pure liquid triazine.

The following table further illustrates preparation of specific substituted s-triazine compounds of the invention using various catalysts and using the general methods described in the preceding examples. In this Table V the triazine product in each instance is symmetrically substituted as indicated on the 2, 4, 6 carbon atoms, except for Example 29 where the substituents are two $CF_3CF_2OCF_2CF_2$— and one $CF_3(CF_2)_5$— radical.

Infrared analysis indicates a high conversion to triazine, but still some free nitrile groups are present. The transparent elastomer becomes tack-free and firmer on standing.

Example 46

$NCCF_2CF_2OCF_2CF_2CN$, B.P. 62° C. (0.560 gm.), and $(C_4H_9)_3SbO$ (0.008 gm.) are mixed in a dry glass tube. The closed tube is swirled at room temperature. The catalyst dissolves to give a colorless homogeneous solution. The viscosity increases gradually on standing. After several days, the viscous colorless polymer containing considerable triazine crosslinks (by infrared analysis) is heated at 105° C. for 8 hours to yield a firm, rigid, transparent polymer. A sample of the elastomer is refluxed in water for 20 hours. The weight loss is 1.5%.

Example 47

In a dry tube is placed 1.18 gm. of $$NCCF_2CF_2OCF_2CF_2CF_2CF_2OCF_2CF_2CN$$

B.P. 132° C., and 0.020 gm. of $(n-C_4H_9)_3Sb(OH)_2$. The tube is stoppered and the mixture heated at 90° C. The catalyst dissolves after about 15 minutes and the solution increases in viscosity and cures to a gel after 1.5 hours. Heating is continued for 22 hours at 90° C. The product is a transparent, resilient triazine rubber.

Example 48

In a dry glass vial is placed 0.767 gm. of $$NC(CF_2CF_2OCF_2CF_2)_4CN$$

B.P. 125° C. at 10 mm. Hg, and 0.012 gm. of $(n-C_4H_9)_3Sb(OH)_2$. The vial is capped and the mixture is heated at 95° C. After 3.5 hours, a slightly viscous polymer solution is formed. A solid gel is formed after an additional 2 hours of heating at 95–100° C. This triazine polymer is heated further at 100° C. (19 hours), and 125° C. (5 hours) to yield a very resilient transparent elastomer.

TABLE V

| Example No. | Catalyst | Nitrile | Triazine product ring substituent |
|---|---|---|---|
| 25 | $(n-C_4H_9)_3SbO$ | $CF_3OCF(CF_3)CF_2OCF(CF_3)CN$ | $CF_3OCF(CF_3)CF_2OCF(CF_3)$ |
| 26 | $(n-C_4H_9)_3SbO$ "A" | $(CF_3)_2CFCN$ | $(CF_3)_2CF-$ |
| 27 | $(n-C_4H_9)_3SbO$ "A" | $H(CF_2)_6CN$ | $H(CF_2)_6-$ |
| 28 | $(n-C_4H_9)_3SbO$ "A" | $CF_3CF_2OCF(CF_3)CF_2—CN$ | $CF_3CF_2OCF(CF_3)CF_2$ |
| 29 | $(n-C_4H_9)_3Sb(OH)_2$ | $2CF_3(CF_2)_4CN$ and $1CF_3CF_2OCF_2CF_2CN$ | $CF_3CF_2OCF_2CF_2—$ and $CF_3(CF_2)_4—$ |
| 30 | $(n-C_4H_9)_3SbO$ | $F[CF(CF_3)CF_2O]_8CF(CF_3)CN$ | $F[CF(CF_3)CF_2O]_8CF(CF_3)$ |
| 31 | $(C_4H_9)_3SbO$ | $F[CF(CF_3)CF_2O]_{11}CF(CF_3)CN$ | $F[CF(CF_3)CF_2O]_{11}CF(CF_3)$ |
| 32 | $(C_2H_4)_3SbO$ | $n-C_8F_{17}OCF(CF_3)CN$ | $n-C_8F_{17}OCF(CF_3)$ |
| 33 | $(n-C_4H_9)_3SbO$ "A" | $C_2F_5O(C_2F_4O)_4CF_2CN$ | $C_2F_5O(C_2F_4O)_4CF_2—$ |
| 34 | $(n-C_4H_9)_3SbO$ "A" | $HCF_2O(C_2F_4O)_4CF_2CN$ | $HCF_2O(C_2F_4O)_4CF_2—$ |
| 35 | $(n-C_4H_9)_3SbO$ "A" | $C_2F_4O(C_2F_4O)CF_2CN$ | $C_2F_5OC_2F_4OCF_2—$ |
| 36 | $(C_2F CH_2CH_2)_2(n-C_4H_9)SbO$ | $C_2F_4O(C_2F_4O)_3CF_2CN$ | $C_2F_5O(C_2F_4O)_3CF_2—$ |
| 37 | $(C_6H_4)(n-C_4H_9)_2SbO$ | $CF_3O(C_2F_4O)_2CF_2CN$ | $CF_3O(C_2F_4O)_2CF_2—$ |
| 38 | $(n-C_4H_9)_3SbO$ "A" | $Br(C_2F_4O)_4CF_2CN$ | $Br(C_2F_4O)_5CF_2—$ |
| 39 | $(n-C_4H_9)_3SbO$ "A" | $F[(CF_2)_6O(CF_2)_4]_2CF_2CN$ | $F[(CF_2)_6O(CF_2)_4]_2CF_2—$ |
| 40 | $(n-C_4H_9)_3SbO$ "A" | $Cl(C_2F_4O)_3CF_2CN$ | $Cl(C_2F_4O)_3CF_2—$ |
| 41 | $(n-C_4H_9)_3SbO$ "A" | $C_6F_5CF_2CN$ | $C_6F_5CF_2—$ |
| 42 | $(n-C_4H_9)_3SbO$ "A" | $F[(CF_2)_4O(CF_2)_4]_2(CF_2)_2CN$ | $F[(CF_2)_4O(CF_2)_4]_2(CF_2)_2—$ |
| 43 | $(n-C_4H_9)_3SbO$ "A" | $C_2F_5O(CF_2)_2[(CF_2)_2O(CF_2)_2]_4CN$ | $C_2F_5O(CF_2)_2[(CF_2)_2O(CF_2)_2]_4$ |

Example 44

$NC(CF_2)_8CN$ (0.98 gm. 1.9 mmole), B.P. 148° C., and 0.012 gm. (0.037 mmole) of $(C_4H_9)_3SbO$ are mixed in a glass vial and let stand at room temperature. After standing overnight, a white-waxy solid is formed. Infrared examination reveals a strong 6.4 micron peak due to triazine formation and a moderate 4.4 micron peak due to the starting nitrile. The solid hardens on further standing.

Example 45

In a dry, screw top glass vial is placed 1.0 gm. (2.2 mmole of $NC(CF_2)_8CN$, 0.53 gm. (1.8 mmole) of $C_5F_{11}CN$, B.P. 56° C., and 0.018 gm. (0.057 mmole) of $(C_4H_9)_3SbO$. The mixture is shaken and let stand at room temperature. Infrared examination of the liquid mixture after 4 hours reveals a strong triazine peak at 6.4 and a nitrile peak at 4.4 micron. On standing overnight, a very viscous transparent liquid forms which in two more days yields a slightly tacky, transparent gel.

Example 49

To a dry glass ampoule is added about 1.4 gm. of $NCCF_2CF_2OCF_2CF_2CN$ and about 0.02 gm. of $$(n-C_4H_9)_3Sb(OH)_2$$

The tube is sealed with a flame and the tube and contents heated 1 hour at 50° C. to yield a homogeneous solution. On heating overnight at 95° C., a transparent triazine rubber is formed.

Example 50

In a dry glass vial is placed 1.02 gm. of $$NCCF_2CF_2OCF_2CF_2CN$$

B.P. 62° C., 0.73 gm. of $C_2F_5OCF_2CF_2CN$, B.P. 35° C., 0.021 gm. $(n-C_4H_9)_3Sb(OH)_2$. The vial is tightly capped and heated to 50° C. for two days to afford a colorless, viscous liquid. This fluid triazine prepolymer is transferred to a small glass bulb through a glass side tube. The tube is sealed off with a flame and heated at 100° C.

overnight. The glass is broken to release a triazine rubber sphere having good resiliency.

Example 51

In a dry tube is placed about 1 gm. $C_7F_{15}CN$ and about 0.1 gm. $(C_6H_5)_3SbO$. The tube is sealed with a flame and the tube and its contents heated 4 days at 120° C. An infrared spectrum of the clear, slightly yellow product indicates complete conversion of the nitrile to the corresponding triazine, $(C_6F_{15})_3C_3N_3$.

Example 52

A mixture of 1.5 gm. of $NC(CF_2CF_2OCF_2CF_2)_2CN$ and 0.030 gm. $(C_4H_9)_3Sb(OH)_2$ is prepared in a dry vial and the nitrile allowed to trimerize for one day at about 50° C. to yield a slightly viscous colorless liquid. About 0.10 gm. of an inert powdered siliceous thickening agent, Cabosil M-6 (Godfrey L. Cabot Co.), is mixed with the liquid triazine polymer. The very thixotropic mixture is used as a sandwich filling or seal between two small aluminum panels. This structure is placed in an anhydrous oven first for one day at 50° C. and then immediately thereafter for one day at 100° C. to yield the cured structure.

Example 53

A mixture of 5 gm.

$$NC(CF_2)_2[(CF_2CH_2)_2CF_2CF(CF_3)]_x(CF_2)_2CN$$

where $x$ is an average value of about 30, and 0.025 gm. of $(C_4H_9)_3Sb(OH)_2$ are mixed well, in the absence of moisture, and heated at 100° C. overnight to yield an elastomer containing triazine crosslinks.

Using the above procedure, the following polymers are cured by triazine crosslinking:

Example 54

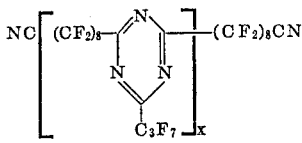

where $x$ has an average value of about 40

Example 55

$$NC[(CF_2)_2O(CF_2)_2]_{10}CN$$

Example 56

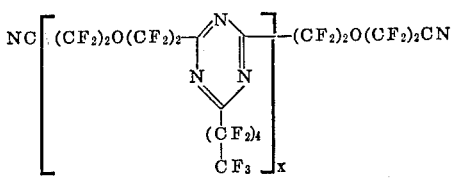

where $x$ has an average value of about 25.

A liquid polymer as shown in the following table is mixed in a dry vessel with about 5 weight percent of a relatively short chain dinitrile, $NC(CF_2CF_2OCF_2CF_2)_2CN$ and 0.1 weight percent of $(n-C_4H_9)_3SbO$ (based on the polymer used) and is heated under anhydrous conditions at 60° C. for eight hours, and then at 100° C. for 12 hours to obtain a cured rubber with triazine crosslinking.

Example 57

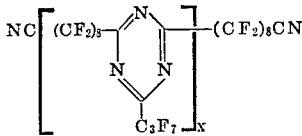

where $x$ has an average value of about 40

Example 58

$$NC[(CF_2)_2O(CF_2)_2]_{10}CN$$

Example 59

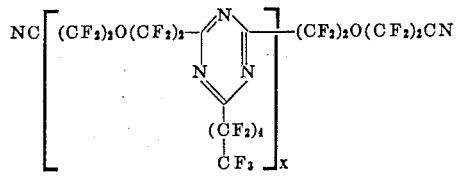

where $x$ is an average value of about 25

Example 60

$$NC(CF_2)_2[(CF_2CH_2)_6CF_2CF(CF_3)]_x(CF_2)_2CN$$

where $x$ is an integer with an average value of about 30.

Example 61

An experiment is run to demonstrate the effect of admixed water upon the process of this invention. 10 gm. $C_5F_{11}CN$ (92.5 mole percent), 0.2 gm.

$$(n-C_4H_9)_3Sb(OH)_2$$

(1.6 mole percent), and 0.04 gm. water (6 mole percent) are mixed in a closed reactor. A control experiment using comparable conditions and quantities of reactants, except that no water is added, is also run. It is determined by gas-liquid absorption chromatographic analysis of the reaction mixtures that the rate of trimerization in the control experiment is appreciably greater than the rate in the experiment where water is added. After 1 hour at room temperature the yields are as shown in Table VI

TABLE VI

| Experiment | Yield of triazine after 1 hour, percent | Yield of triazine after 24 hours, percent |
| --- | --- | --- |
| No water added (control) | 19 | 80 |
| 6 mole percent water added | 13 | 65 |

I claim:
1. In a process for trimerizing a trimerizable nitrile, the improvement which comprises contacting under substantially anhydrous conditions said trimerizable nitrile with catalyst formula

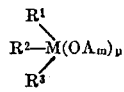

wherein $R^1$, $R^2$ and $R^3$ are aliphatic radicals containing less than 19 carbon atoms each and are selected from the group consisting of alkyl, alkoxyalkyl, cycloalkyl, and fluoroalkyl and aromatic radicals containing less than 19 carbon atoms each and selected from the group consisting of phenyl, α-naphthyl, p-methoxyphenyl, o-methoxyphenyl, and p-methylaminophenyl; M is selected from the group consisting of $As^V$, $Sb^V$ and $Sn^{IV}$; A is selected from the group consisting of hydrogen, said aliphatic radicals having less than 8 carbon atoms, said aromatic radicals and the radical

O is oxygen; $m$ is the integer zero or 1; $p$ is the integer 1 or 2, and when $m$ equals 1, the sum of $3+p$ is equal to the valence of M, and when $m$ is zero, M is $As^V$ or $Sb^V$.

2. The process of claim 1 wherein the nitriles have the formula

XCN where X is a haloaliphatic radical.

3. The process of claim 2 wherein X is the monovalent radical

where Y is selected from the group consisting of fluorine, chlorine, cyano, and fluoroaliphatic radicals, and $Z_1$ and $Z_2$ are each selected from the group consisting of fluorine, chlorine, and lower perfluoroalkyl, and when either $Z_1$ or $Z_2$ is lower perfluoroalkyl, then the other Z is fluorine.

4. The process of claim 2 wherein X is a fluoroaliphatic polynitrile radical.

5. The process of claim 2 wherein X is a fluoroaliphatic nitrile radical.

6. The process of claim 2 wherein X is a perfluoroalkyl radical.

7. The process of claim 2 wherein X is a fluoroaliphatic ether radical.

8. The process of claim 2 wherein X is a fluoroaliphatic ether polynitrile radical.

9. The process of claim 2 wherein X is a fluoroaliphatic ether nitrile radical.

10. The process of claim 1 wherein said nitrile comprises at least two different nitriles.

11. The process of claim 1 wherein said nitrile is a polynitrile.

12. The process of claim 1 wherein said catalyst is

where $R^1$, $R^2$ and $R^3$ are each lower alkyl radicals having less than 8 carbon atoms.

13. The process of claim 1 wherein said catalyst is

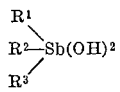

where $R^1$, $R^2$ and $R^3$ are each lower alkyl radicals having less than 8 carbon atoms.

14. The process of claim 1 wherein said catalyst is $(n-C_4H_9)_3SbO$.

15. The process of claim 1 wherein said catalyst is $(CH_3)_3Sb(OH)_2$.

16. The process of claim 1 wherein said catalyst is a mercury containing trialkyl substituted antimony oxide prepared by oxidation of a trialkyl antimony compound with mercuric oxide.

17. The process of claim 1 wherein such a combination of said nitrile and said catalyst are chosen that one is at least partially soluble in the other.

18. The process of claim 1 wherein said nitrile and said catalyst are both dissolved in an inert solvent.

19. The process of claim 1 wherein mole percent of said catalyst relative to said nitrile ranges from about 0.1 to 10.

References Cited

UNITED STATES PATENTS

| | | | |
|---|---|---|---|
| 2,467,926 | 4/1949 | Ardis | 260—78.4 XR |
| 2,598,811 | 6/1952 | Mahan et al. | 260—248 |
| 2,824,852 | 2/1958 | Kern | 260—78.4 XR |
| 3,086,946 | 4/1963 | Brown | 260—78.4 XR |
| 3,095,414 | 6/1963 | Spainhour | 260—248 |
| 3,278,492 | 10/1966 | Herbstman | 260—248 XR |
| 3,369,002 | 2/1968 | Griffin | 260—78.4 |

HENRY R. JILES, Primary Examiner

J. M. FORD, Assistant Examiner

U.S. Cl. X.R.

252—78; 260—78.4, 999

PO-1050
(5/69)

UNITED STATES PATENT OFFICE
CERTIFICATE OF CORRECTION

Patent No. 3,470,176      Dated September 30, 1969

Inventor(s) Joseph LaMar Zollinger

It is certified that error appears in the above-identified patent and that said Letters Patent are hereby corrected as shown below:

Column 3, line 23, that portion of the formula reading "ClCF$_2$Cl" should read --ClCF$_2$CFCl--; line 44, the portion of the formula in brackets should be followed by a subscript 3. Column 5, line 22, that portion of the formula reading "NCCF(CF$_3$[" should read --NCCF(CF$_3$)[--; lines 35-41 the portion of the formula reading "(CF$_2$)$_8$" should read --(CF$_2$)$_6$--. Column lines 44-50 the portion of the formula reading "X$^6$" should read --X--. Column 10, line 27, "anr" should read --and--; line 67 "observerd" should read --observed--. Column 11, line 12, "(C$_4$H$_9$)$_3$SbO'C$_2$H$_5$OH" should read --(C$_4$H$_9$)$_3$SbO·C$_2$H$_5$OH--. Column 13 and 14, Table V, the formulas for the catalysts of Example Nos. 31, 32, 36 and 37 should respectively read as (n-C$_4$H$_9$)$_3$SbO, (C$_2$H$_5$)$_3$SbO, (C$_3$F$_7$CH$_2$CH$_2$)$_2$(n-C$_4$H$_9$)SbO, (C$_6$H$_5$)(n-C$_4$H$_9$)$_2$SbO. Formulas for the nitriles of Example Nos. 29, 31, 33, 35, 36 and 38 should respectively read as 2CF$_3$(CF$_2$)$_5$CN and 1CF$_3$CF$_2$OCF$_2$CF$_2$CN, F[CF(CF$_3$)CF$_2$O]$_{15}$CF(CF$_3$)CN, C$_2$F$_5$O(C$_2$F$_4$O)$_4$CF$_2$CN, C$_2$F$_5$O(C$_2$F$_4$O)CF$_2$CN, C$_2$F$_5$O(C$_2$F$_4$)$_3$CF$_2$CN, Br(C$_2$F$_4$O)$_5$CF$_2$CN. The triazine product ring substituent for Example 29 should read CF$_3$CF$_2$OCF$_2$CF$_2$- and CF$_3$(CF$_2$)$_5$-. Column 15, line 10, the formula should read --(C$_7$F$_{15}$)$_3$C$_3$N$_3$--. Column 16, line 48, after cataly insert "of the". Column 18, line 3, delete the second supersc 2 and insert a subscript 2.

SIGNED AND
SEALED
MAY 12 1970

(SEAL)
Attest:

Edward M. Fletcher, Jr.
Attesting Officer

WILLIAM E. SCHUYLER, JR.
Commissioner of Patents